R. McFARLANE.
SCALE.
APPLICATION FILED AUG. 13, 1912.
1,196,468.
Patented Aug. 29, 1916.
2 SHEETS—SHEET 1.
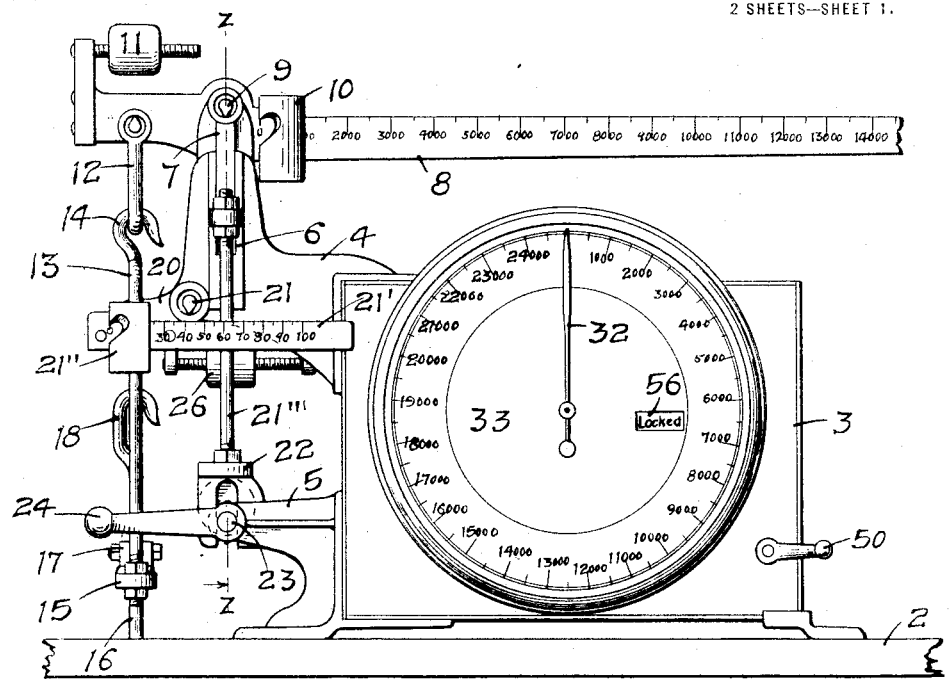
Fig 1.
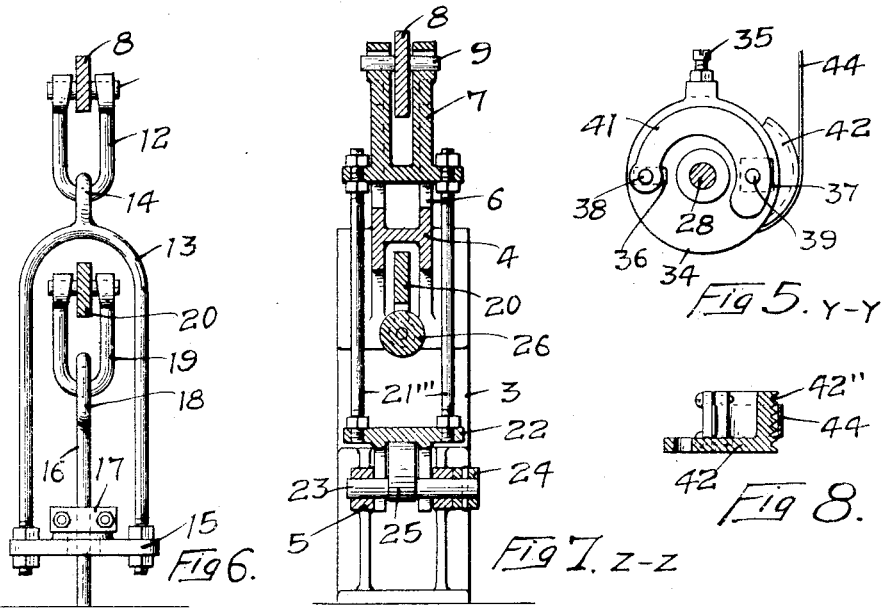
Fig 6.  Fig 7. Z-Z  Fig 5. Y-Y  Fig 8.
WITNESSES
INVENTOR
ROBERT McFARLANE
BY Paul & Paul
ATTORNEYS R. McFARLANE.
SCALE.
APPLICATION FILED AUG. 13, 1912.
1,196,468.
Patented Aug. 29, 1916.
2 SHEETS—SHEET 2.
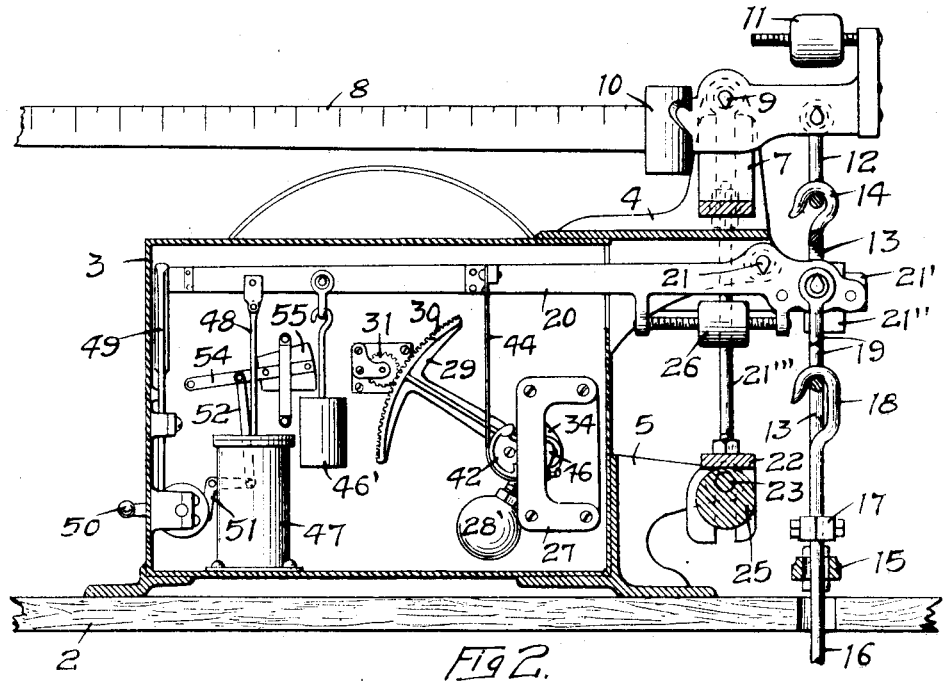
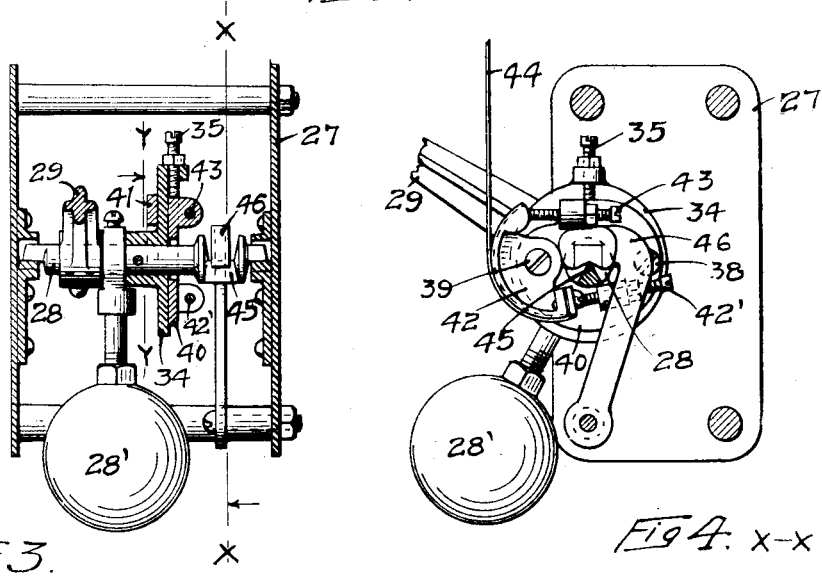
WITNESSES
INVENTOR
ROBERT McFARLANE
BY Paul H Paul
ATTORNEYS

UNITED STATES PATENT OFFICE.

ROBERT McFARLANE, OF MINNEAPOLIS, MINNESOTA, ASSIGNOR TO McFARLANE MANUFACTURING COMPANY, OF ST. PAUL, MINNESOTA, A CORPORATION.

SCALE.

1,196,468.  Specification of Letters Patent.  Patented Aug. 29, 1916.

Application filed August 13, 1912. Serial No. 714,789.

*To all whom it may concern:*

Be it known that I, ROBERT McFARLANE, of Minneapolis, Hennepin county, Minnesota, have invented certain new and useful Improvements in Scales, of which the following is a specification.

My invention relates to weighing scales and the object of the invention is to improve the construction of scale shown and described in my pending application Serial No. 672,885, filed January 23, 1912.

A further object is to provide a weighing scale having a main and auxiliary beam with a mechanism for rendering either one of them operative or inoperative, said mechanism being constructed to allow the shifting of the load from one beam to the other without oscillating the beam or causing a movement which would require some little time for the mechanism to settle or regain its poise before the weighing operation could be performed.

A further object is to provide a scale having an adjusting means which will greatly facilitate the setting up of the scale and the balancing of the beams preparatory to weighing.

Other objects of the invention will appear from the following detailed description.

The invention consists generally in various constructions and combinations, all as hereinafter described and particularly pointed out in the claims.

In the accompanying drawings forming part of this specification, Figure 1 is a front view of a weighing scale embodying my invention, Fig. 2 is a vertical sectional view of the same, Fig. 3 is a transverse sectional view through the adjusting mechanism connected with the indicator hand, Fig. 4 is a sectional view on the line $x$—$x$ of Fig. 3, looking in the direction of the arrow, Fig. 5 is a sectional view on the line $y$—$y$ of Fig. 3, Fig. 6 is a detail view showing the operation of the mechanism for shifting the load from one beam to the other, Fig. 7 is a sectional view on the line $z$—$z$ of Fig. 1, Fig. 8 is a detail view of the edge of the sector plate, to which the auxiliary beam ribbon or strap is attached.

In the drawing, 2 represents a platform, which may form the upper portion or superstructure of a platform scale, the lower portion of the scale and the levers being omitted, as they form no part of my present invention. Upon this platform a stationary housing or casting 3 is mounted, and provided at one end with outwardly projecting brackets 4 and 5. On the bracket 4 I provide a vertical guide-way 6 in which a casting 7 is slidable. The main beam 8 of the scale has a pivot 9 in said casting and is suitably graduated to weigh heavy loads and provided with the usual sliding poise 10 and a counter-balance 11 carried by the short arm of the beam. A link 12 is pivotally connected with the short arm of the main beam and a U-shaped bail 13 has a hook 14 connected with the link 12. The ends of the bail 13 are provided with a cross bar 15 through which a rod 16 extends down to the scale levers. (Not shown). A stop 17 is adjustably mounted on this scale rod. An elongated hook 18 is provided at the upper end of the scale rod and engages a link 19 pivotally supported on the short arm of an auxiliary beam 20 which is pivoted at 21 on the bracket 4. A graduated beam 21' is mounted on the beam 20 and has a poise 21''. This beam is preferably graduated for weights under one hundred pounds and may be utilized to indicate the weights of articles of less weight than the graduations of the dial. This beam may also be used to indicate the tare, if preferred. The pivots of the links 12 and 19 are in vertical alinement with one another, as plainly indicated in Fig. 2, and the load on the scale rod may be transferred from one beam to the other by the vertical movement of the casting or slide 7 and the pivots of the main beam.

Any suitable mechanism may be employed for shifting the weight from one beam to the other, but I prefer to provide rods 21''' connecting the lower portion of the slide 7 with the casting 22. A shaft 23 having an operating lever 24 is mounted on the bracket 5 and provided with a cam 25 that is adapted to contact with the under surface of the casting or plate 22 and raise the slide 7 to lift the pivots of the main beam and relieve the auxiliary beam of its load. The movement of the cam in the other direction will obviously effect a reversal of the movement of the mechanism and transfer the load from the main beam to the auxiliary beam. This operating mechanism is somewhat similar to that shown and described in my application above referred to, except that the shifting mechanism raises and lowers the main beam and its pivots bodily instead of being connected with the short arm of the main beam, as in my application above referred to. Furthermore, the lever and cam are located below the auxiliary beam and the slide supporting the main beam is held against oscillation by its vertical guide, consequently there can be no swaying or rocking of the beam connections during the shifting operation and the weighing of the merchandise can be performed as soon as the mechanism has been operated, without the necessity of waiting for the parts to come to a state of rest. I regard this device for transferring the weight from one beam to the other of particular importance in this present case, as the saving of time in a scale of this type is the essence of its commercial success and obviously any mechanism which would necessitate the operator waiting for the beams to come to a state of rest or to cease oscillation after operating the shifting mechanism would be more or less objectionable. I have found in practical operation that by raising and lowering the main beam bodily that there is practically no oscillation of the beams after the shifting operation and practically no time is lost in weighing.

Near the pivot of the auxiliary beam 20 is a counter balance weight 26 located preferably beneath the bracket 4 and the long arm of said beam projects into the casing 3. A frame 27 is secured within this casing and has bearings on each side for a rock shaft 28. A quadrant 29 is adjustably mounted on this shaft and has teeth 30 to engage a pinion 31 on the post of an indicator hand 32 which is movable over a dial 33 mounted on the front of the casing and suitably graduated for weighing heavy loads. A balance weight 28' is mounted on the rock shaft 28 and is adapted to counteract the pull of the beam 20 on the rock shaft, as will hereinafter appear, and thereby enable the mechanism to be brought to a balance to indicate the weight of the load on the scale platform.

It is desirable to provide a mechanism for adjusting the indicator hand when the scale is set up to adapt its movement to uniform spacing of the graduations on the dial. A disk 34 has a hub secured on the shaft 28. An adjusting screw 35 is carried by the disk 34 near its periphery and projects inwardly and radially with respect to said disk. Slots 36 and 37 are provided in the disk 34 upon opposite sides of the center thereof and screws 38 and 39 are mounted in a disk 40 and project through these slots. The disk 40 has a comparatively large central opening to receive the shaft 28 and allow adjustment of the disk 40 in a plane parallel with that of the disk 34. A screw 35 bears on the disk 40 and when the screws 38 and 39 are loosened, the disk 40 may be moved to change its position on the disk 34. A semi-circular plate 41 is preferably located on the opposite side of the disk 34 from the disk 40 and receives the screws 38 and 39 and takes the place of washers and nuts for said screws. A sector-shaped plate 42 is preferably mounted on the screw 39 and adjusting screws 42' and 43 are adapted to contact with the ends of this plate and tilt it on its pivot. A strap 44 is connected to said plate at one end and to the auxiliary beam 20 at the other end and the tilting of the plate 42 by the adjustment of its screws increases or decreases the tension of the strap 44 while the edgewise movement of the disk 40 serves to move the strap 44 horizontally until the movement of the auxiliary beam and the indicator hand are suitably timed. As shown in Fig. 8, I prefer to provide the edge of the sector-shaped plate with a series of corrugations or depressions 42'', with which the strap 44 contacts when the scale is set up. These corrugations receive the dust or foreign material which may accumulate on the edge of the plate and prevent such dust and foreign material from throwing the strap 44 out of adjustment on the plate.

The rock shaft 28 is preferably provided with an inverted knife edge bearing 45 and a hook 46 is mounted on the frame 27 and adapted to rest on said bearing and hold the pivots of the rock shaft in place during the adjusting operation and during the use of the scale. A weight 46' is carried by the auxiliary beam within the casing and I also prefer to provide a dash-pot device for the auxiliary beam, consisting of a cylinder 47 having a piston (not shown), connected by a rod 48 with the beam for the purpose of insuring uniform movement of the beam. Jaws 49 are arranged in position to clamp the end of the beam and lock it in any desired position, being actuated by a lever device 50. A bell crank 51 is connected with these locking jaws and has a link connection 52 with an arm 54 which carries an indicator plate 55 that is movable back and forth over an opening 56 in the dial. Through this opening suitable lettering on the indicator plate 55 may be observed, as, for instance, the words "Locked" and "Unlocked," which will indicate the position of the jaws 49 and whether the auxiliary beam is free to perform its weighing functions. This mechanism is substantially the same as shown and described in my former application above referred to and further description and illustration is unnecessary.

In the operation of the scale, the load is placed on the platform and if the mechanism is in position to transmit the weight of the auxiliary beam the indicator hand 32 will move over the face of the dial and enable the operator to determine at a glance the weight of the load. At any time the auxiliary beam may be rendered inoperative and the main beam used entirely for weighing purposes.

With this scale I am able to easily and quickly weigh packages without the necessity of moving the poise of the main beam back and forth to obtain a balance. The apparatus is therefore particularly useful in railroad freight houses and warehouses, where it is desirable to ascertain at a glance the weight of a truck load of merchandise and where inaccuracy in weighing frequently arises through lack of time to balance the oscillating beam. Whenever desired, the main scale beam may be utilized for weighing purposes by merely shifting the cam operating mechanism and the accuracy of the auxiliary weighing mechanism can be verified.

In various ways the details of construction herein may be modified and still be within the scope of my invention.

I claim as my invention:—

1. A weighing scale comprising a scale beam having a poise, a rod connected with said beam, an auxiliary beam pivotally supported independently of said first named beam and also connected with said rod, a dial and indicator hand therefor operatively connected with said auxiliary beam, a vertically movable slide whereon said scale beam is pivoted, a plate, rods connecting said slide with said plate, a rock shaft and operating lever therefor, and a cam mounted on said rock shaft and engaging said plate to raise said slide and the pivots of said scale beam and shift the load from one beam to the other.

2. A weighing scale comprising a scale beam having a poise, a rod connected with said beam, an auxiliary beam pivotally supported independently of said first named beam and also connected with said rod, a graduated dial and indicator hand therefor, a rock shaft, relatively movable disks mounted on said rock shaft, a sector-shaped plate carried by one of said disks, a strap connecting said sector-shaped plate with said auxiliary beam, and a quadrant mounted on said rock shaft and geared to said indicator hand.

3. In a scale, a pivoted beam, a scale rod therefor, a dial and indicator hand, a rock shaft, a disk secured on said shaft, a second disk having an edgewise adjustment on said first named disk, a sector-shaped plate carried by said second disk, a strap connecting said plate with said auxiliary beam, and a quadrant mounted on said rock shaft and operatively connected with said indicator hand.

4. The combination, with a weighing beam and a scale rod, of an indicator hand, a dial, a rocking disk having slots therein, a second disk adjustable in said slots edgewise of said first named disk, a strap connecting said adjustable disk with said beam, and means connecting said disk with said indicator hand.

5. In a scale, a beam, a scale rod therefor, a dial and indicator hand, a rock shaft, a counter balance thereon, a disk secured on said shaft, a second disk slidably mounted on the face of said first named disk, a sector-shaped plate secured to said second disk and adjustable therewith, a strap connecting said sector-shaped plate with said beam, and means operatively connecting said rock shaft with said indicator hand.

6. In a scale, a beam, a scale rod connected therewith, an indicator hand and dial, a rock shaft, a disk secured thereon, a second disk adjustable on said first named disk, a sector-shaped plate pivoted on said adjustable disk, means for tilting said plate, a strap connecting said plate with said beam, and means connecting said rock shaft with said indicator hand.

7. The combination, with a beam and a scale rod connected therewith, of a graduated dial and indicator hand, a rock shaft having knife edge bearings, a hook device having a knife edge bearing on said shaft to prevent upward movement thereof, means operatively connecting said rock shaft with said indicator hand, a counter-balance for said rock shaft, and a flexible strap connecting said rock shaft with said beam.

8. The combination with a scale frame, of a scale beam, a scale rod connected with said beam, an auxiliary weighing device comprising a rocking pendulum, an indicator hand geared to said rocking pendulum, an auxiliary beam interposed in said scale rod and having a flexible connection with said rocking pendulum, and means for shifting the load from said main beam to said auxiliary beam.

9. A scale comprising a pivoted weighing beam, a poise for said beam, a beam rod, the pivot of said beam being between said beam-rod and said poise, an auxiliary weighing device comprising a stationary casing, a beam pivoted therein and interposed in said beam-rod, an indicator hand operatively connected with said auxiliary beam, and means for raising and lowering the pivot of said weighing beam to shift the load from said weighing beam to said auxiliary beam, or vice versa.

10. The combination, with a scale frame and a casing seated thereon, of a weighing beam having a pivotal support on said casing, a scale rod connected with said beam, an auxiliary weighing device mounted in said casing and including a pendulum weight, a dial and indicator hand, and means for operating said indicator hand from said weight, an auxiliary beam having a flexible connection with said pendulum weight and interposed in said scale rod, and means for shifting the load on said scale rod from said main beam to said auxiliary beam.

11. The combination, with a scale frame, of a scale beam mounted thereon, a scale rod connected with said beam, an auxiliary weighing device mounted on said frame and comprising a rocking pendulum, a dial and indicator hand geared to said rocking pendulum, an auxiliary beam interposed in said scale rod and having a flexible connection with said rocking pendulum, and means for shifting the load from said main beam to said auxiliary beam.

In witness whereof I have hereunto set my hand this 31st day of July, 1912.

ROBERT McFARLANE.

Witnesses:
GENEVIEVE E. SORENSEN,
CATHERINE H. REHFUSS.

Copies of this patent may be obtained for five cents each, by addressing the "Commissioner of Patents, Washington, D. C."